United States Patent
Lee et al.

(10) Patent No.: US 10,750,419 B2
(45) Date of Patent: Aug. 18, 2020

(54) METHODS OF EFFICIENT HANDOVER AND RESELECTION TO A HOME ENODEB USING USER EQUIPMENT MOTION

(71) Applicant: QUALCOMM Incorporated, San Diego, CA (US)

(72) Inventors: Kuo-Chun Lee, San Diego, CA (US); Sivaramakrishna Veerepalli, San Diego, CA (US); Can Zhao, San Diego, CA (US); Arnaud Meylan, San Diego, CA (US); Srinivasan Balasubramanian, San Diego, CA (US); Aziz Gholmieh, San Diego, CA (US); Feilu Liu, San Diego, CA (US); Cherng-Shung Hsu, Sam Diego, CA (US); YuHung Kao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 14/614,325

(22) Filed: Feb. 4, 2015

(65) Prior Publication Data
US 2016/0227458 A1   Aug. 4, 2016

(51) Int. Cl.
*H04W 36/00* (2009.01)
*H04W 36/14* (2009.01)
(Continued)

(52) U.S. Cl.
CPC ......... *H04W 36/165* (2013.01); *H04W 36/32* (2013.01); *H04W 48/04* (2013.01);
(Continued)

(58) Field of Classification Search
CPC . H04W 36/32; H04W 36/04; H04W 36/0083; H04W 36/0061; H04W 36/0016
(Continued)

(56) References Cited

U.S. PATENT DOCUMENTS

| 2005/0026619 A1 | 2/2005 | Jha |
| 2008/0002660 A1 | 1/2008 | Jeong et al. |

(Continued)

FOREIGN PATENT DOCUMENTS

| EP | 2343928 A1 | 7/2011 |
| WO | WO-2014/053660 A1 | 4/2014 |

OTHER PUBLICATIONS

International Search Report and Written Opinion—PCT/US2015/068062—ISA/EPO—dated Mar. 17, 2016. 12 Total Pages.
(Continued)

*Primary Examiner* — Khaled M Kassim
*Assistant Examiner* — Jason A Harley
(74) *Attorney, Agent, or Firm* — Arent Fox LLP

(57) ABSTRACT

Methods and apparatuses for serving cell management of a user equipment (UE) are presented. Particularly, methods and apparatuses are presented for suppressing a serving cell change based on a speed of the UE. For instance, an example method is presented for serving cell management that may include determining that a serving cell change condition exists for an initiation of a serving cell change for the UE, wherein the serving cell change comprises changing a serving cell of the UE from a macro cell to a low power cell. In addition, the example method may include obtaining a speed of the UE and suppressing the initiation of the serving cell change based on the speed of the UE.

19 Claims, 15 Drawing Sheets

(51) Int. Cl.
*H04B 15/00* (2006.01)
*H04W 36/16* (2009.01)
*H04W 36/32* (2009.01)
*H04W 48/04* (2009.01)
*H04W 84/04* (2009.01)

(52) U.S. Cl.
CPC ........... *H04W 84/045* (2013.01); *Y02D 70/00* (2018.01); *Y02D 70/1242* (2018.01); *Y02D 70/1262* (2018.01); *Y02D 70/142* (2018.01); *Y02D 70/146* (2018.01); *Y02D 70/164* (2018.01); *Y02D 70/26* (2018.01)

(58) Field of Classification Search
USPC ...................................... 455/436, 456.1, 444
See application file for complete search history.

(56) References Cited

U.S. PATENT DOCUMENTS

| | | | |
|---|---|---|---|
| 2012/0108252 A1 | 5/2012 | Dimou et al. | |
| 2012/0276945 A1 | 11/2012 | Chindapol et al. | |
| 2012/0289274 A1* | 11/2012 | Matsuo | H04W 48/02 455/509 |
| 2013/0079025 A1* | 3/2013 | Chen | H04W 72/1215 455/450 |
| 2013/0171995 A1 | 7/2013 | Fujishiro et al. | |
| 2013/0210443 A1 | 8/2013 | Pedersen et al. | |
| 2014/0171087 A1* | 6/2014 | Murari | H04W 52/0254 455/437 |
| 2014/0171125 A1* | 6/2014 | Dalsgaard | H04W 36/0083 455/456.4 |
| 2014/0213262 A1* | 7/2014 | Singh | H04W 36/32 455/437 |
| 2014/0213267 A1* | 7/2014 | Chai | H04W 24/00 455/450 |
| 2014/0219254 A1 | 8/2014 | Fujishiro et al. | |
| 2014/0220979 A1 | 8/2014 | Song et al. | |
| 2014/0334402 A1* | 11/2014 | Chen | H04L 5/0035 370/329 |
| 2014/0335870 A1* | 11/2014 | Yilmaz | H04W 36/32 455/441 |
| 2015/0038173 A1* | 2/2015 | Jackson | H04W 4/025 455/456.3 |
| 2016/0234747 A1* | 8/2016 | Fan | H04W 48/16 |
| 2017/0105172 A1* | 4/2017 | Wilhelmsson | H04W 36/32 |

OTHER PUBLICATIONS

Xenakis D., et al., "Mobility Management for Femtocells in LTE-Advanced: Key Aspects and Survey of Handover Decision Algorithms," IEEE Communications Surveys & Tutorials, Accepted for Publication, 2013, pp. 1-28.

\* cited by examiner

METHODS OF EFFICIENT HANDOVER AND RESELECTION TO A HOME ENODEB USING USER EQUIPMENT MOTION

BACKGROUND

The present disclosure relates generally to communication systems, and more particularly, to methods and apparatuses for serving cell change management in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Currently, when a user equipment (UE) is located in a coverage area of a macro cell and a low power cell (e.g., femto cell, micro cell, Home eNodeB (HeNB), Closed Subscriber Group (CSG) cell), the UE must select (or reselect to) the low power cell for wireless service. However, when the UE is moving at a relatively fast rate of speed, handover to the low power cell can quickly trigger a subsequent reselection to the macro cell because the UE exits the coverage area of the low power cell after a short time.

As such, improvements in cell reselection and handover based on UE speed are needed to optimize user experience and minimize unnecessary serving cell changes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents example methods and apparatuses for serving cell management of a UE. Particularly, methods and apparatuses are presented for suppressing a serving cell change based on a speed of the UE. For instance, an example method is presented for serving cell management that may include determining that a serving cell change condition exists for an initiation of a serving cell change for the UE. In an aspect, the serving cell change may include changing a serving cell of the UE from a macro cell to a low power cell. In addition, the example method may include obtaining a speed of the UE and suppressing the initiation of the serving cell change based on the speed of the UE.

In addition, the present disclosure presents an example UE configured for serving cell management. In an aspect, the example UE may include a a serving cell change condition managing component configured to determine that a serving cell change condition exists for an initiation of a serving cell change for the UE, wherein the serving cell change comprises changing a serving cell of the UE from a macro cell to a low power cell. In addition, the UE may include a UE speed obtaining component configured to obtain a speed of the UE. Furthermore, the UE may include a serving cell change suppressing component configured to suppress the initiation of the serving cell change based on the speed of the UE.

In a further aspect, the present disclosure may include an example UE that includes means for determining that a serving cell change condition exists for an initiation of a serving cell change for the UE, wherein the serving cell change comprises changing a serving cell of the UE from a macro cell to a low power cell. In addition, the example UE may include means for obtaining a speed of the UE and means for suppressing the initiation of the serving cell change based on the speed of the UE.

Moreover, the present disclosure presents an example non-transitory computer-readable medium storing computer-readable code, which comprises code for determining that a serving cell change condition exists for an initiation of a serving cell change for the UE, wherein the serving cell change comprises changing a serving cell of the UE from a macro cell to a low power cell. In addition, the computer-readable code may include code for obtaining a speed of the UE and code for suppressing the initiation of the serving cell change based on the speed of the UE.

Furthermore, the present disclosure presents a method of serving cell management for a UE, which may be executed at a network entity. In an aspect, the example method may include receiving, from a UE, a Proximity Indication message, wherein the Proximity Indication message initiates a serving cell change. In addition, the example method may include obtaining a speed of the UE and suppressing the initiation of the serving cell change based on the speed of the UE.

In addition, the present disclosure presents an example network entity for serving cell management. In an aspect, the example network entity may include a receiver for receiving, from a UE, a Proximity Indication message, wherein the Proximity Indication message initiates a serving cell change. In addition, the example network entity may include a UE speed obtaining component configured to obtain a speed of the UE. Additionally, the network entity may include a serving cell change suppressing component configured to suppress the initiation of the serving cell change based on the speed of the UE.

In addition, the present disclosure presents another example network entity for serving cell management of a UE. In an aspect, the example network entity may include means for receiving, from a UE, a Proximity Indication message, wherein the Proximity Indication message initiates a serving cell change. In addition, the example network entity may include means for obtaining a speed of the UE and means for suppressing the initiation of the serving cell change based on the speed of the UE.

Moreover, the present disclosure presents an example non-transitory computer-readable medium storing computer-readable code, which comprises code for receiving, from a UE, a Proximity Indication message, wherein the Proximity Indication message initiates a serving cell change. In addition, the computer-readable code may include code for obtaining a speed of the UE and code for suppressing the initiation of the serving cell change based on the speed of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
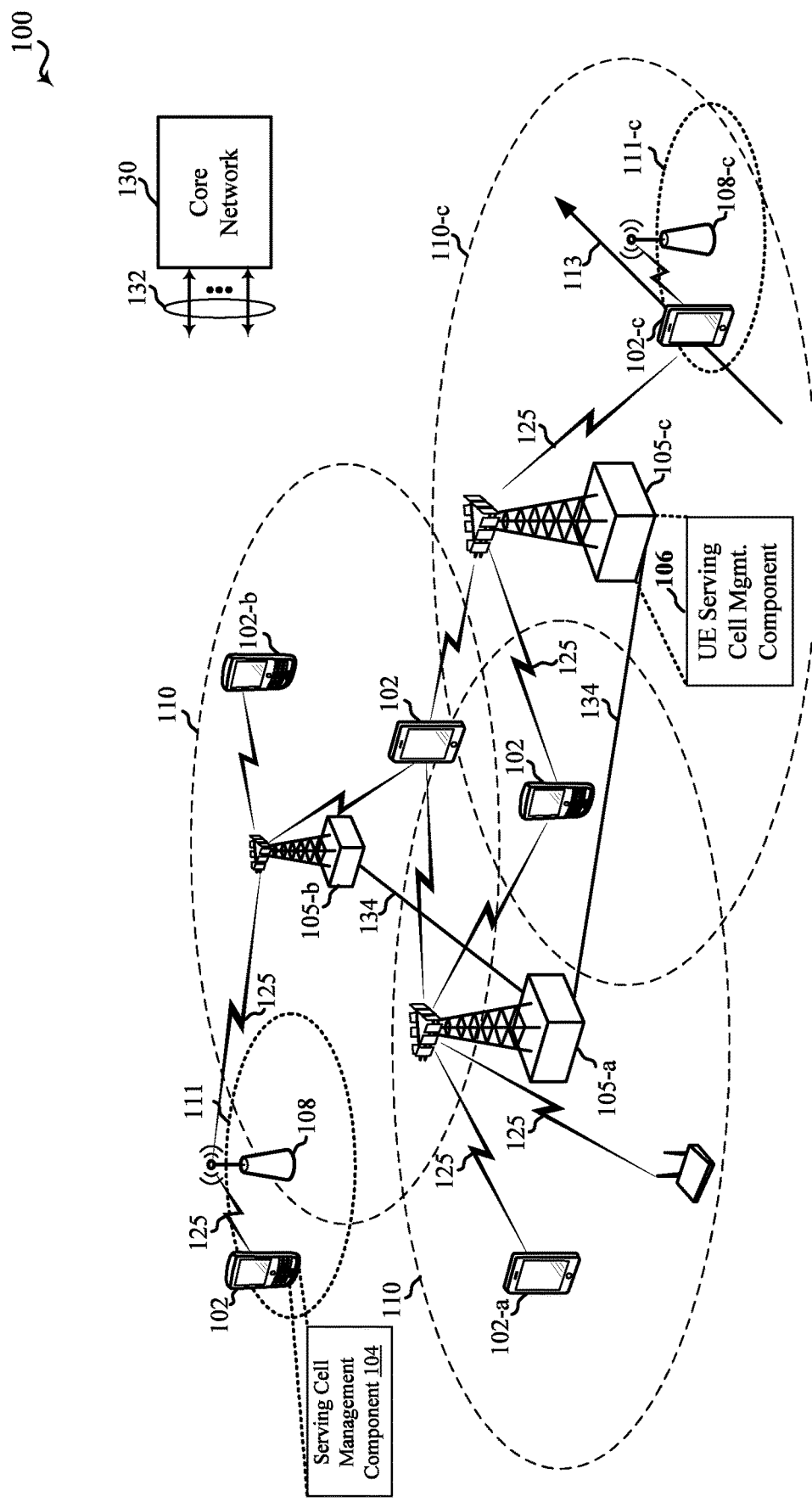
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example methods and apparatuses for improved serving cell handover and reselection for UEs in heterogeneous network environments including macro cells and low power cells. Particularly, the present disclosure describes an example method for determining whether to conduct a cell reselection from a macro cell to a low power cell based on the speed of the UE (or "UE speed").

In an aspect of the present disclosure, the UE speed may be determined or otherwise obtained by the UE or by a network entity (e.g., a macro access point associated with the macro cell). For example, the UE may determine the UE speed using several optional methods. For instance, the UE may utilize Global Positioning Service (GPS) information to determine the UE speed. Alternatively or additionally, the UE may utilize a Reference Signal Received Power (RSRP) change rate or standard deviation thereof to determine the UE speed or detect a speed profile of the UE (e.g., high speed, low speed, or stationary). Furthermore, the UE may be configured to determine the UE speed by utilizing UE acceleration data generated by one or more accelerator sensors of the UE. Moreover, the UE may determine the UE speed by calculating a Doppler frequency shift of one or more signals received by the UE, which may include a Common Reference Signal transmitted by a macro access point.

Alternatively or additionally, in an aspect of the present disclosure, the network entity (e.g., macro access point) may determine the speed of the UE, for example, by using one or both of the following methods. First, the network entity may determine the UE speed based on a determined Doppler frequency shift of one or more signals transmitted by the UE. In an aspect, such a signal may include a Sounding Reference Signal (SRS) transmitted by the UE. Alternatively or additionally, the network entity may determine the UE speed by detecting an uplink (UL) timing change for uplink transmissions from the UE over a certain time interval.

Based on the determined UE speed, the UE or the network entity may suspend cell reselection or handover to a low power using one or more of several optional methods. For instance, where the UE is in idle mode and the UE is camped on the macro cell, the UE may detect a low power cell when the UE enters the serving area of the low power cell (e.g., via receiving a pilot or beacon transmission from the low power cell). According to legacy LTE procedures, this detection of the low power cell would trigger reselection to the low power cell. However, in an aspect of the present disclosure, if the UE finds that the UE speed is larger than a threshold value (or has a relatively high speed profile), the UE may suspend reselection, for example, until the speed is below a second threshold value (or has low speed or stationary speed profile).

In an additional optional example of UE serving cell management, when the UE is in connected mode (e.g., on an active data or voice call with the macro cell), the UE may detect the presence of the low power cell cell. According to legacy LTE methods, this low power cell detection would trigger the UE to generate and transmit a Proximity Indication message to the macro cell to initiate serving cell reselection to the low power cell. In an aspect of the present disclosure, however, if the UE finds that the UE speed is larger than a threshold value (or has a relatively high speed profile), the UE may suspend the generation and/or transmission of the Proximity Indication message, for example, until the speed is below a second threshold value (or has a low speed or stationary speed profile).

In further optional example, a network entity (e.g., a macro access point) may determine the UE speed and may suspend a serving cell change (e.g., handover) based on the determined UE speed. For instance, in an aspect, when the UE is in connected mode (e.g., on an active data or voice call with the macro cell), the network entity may receive a Proximity Indication (and/or a measurement report) from UE that would trigger handover to a low power cell according to legacy LTE procedures. However, in an aspect of the present disclosure, if the network entity determines that a UE speed is larger than a threshold value (or has a relatively high speed profile), the network entity may suspend handover to the low power cell, for example, until it is determined that the UE speed is below a second threshold value (or has a low speed or stationary speed profile).

By utilizing one or more of the methods of managing UE serving cell changes presented herein, the UE and/or a network entity may avoid scenarios in which the a fast-moving UE may enter and exit a coverage area of a low power cell before reselection or handover from a macro cell to the low power cell can be performed, or before the reselection or handover would quickly trigger a subsequent reselection or handover back to the macro cell. As a result, signaling between the UE and network can be minimized, UE and network-side processing loads can be reduced, and overall user experience can be improved.

Referring first to FIG. 1, a diagram illustrates an example of a wireless communications system 100, in accordance with an aspect of the present disclosure. The wireless communications system 100 includes a plurality of macro access points 105 (e.g., base stations, eNBs, or WLAN access points) managing one or more macro cells 110, a plurality of low power access points 108 (e.g., low power base stations, small cell access points, femto cell access points, micro cell access points, or WiFi access points) managing one or more low power cells 111 a number of user equipment (UEs) 102, and a core network 130. In an aspect, macro cell access points 105 may include a UE serving cell management component 106 configured to determine a speed of one or more UEs 102 and determine whether to suppress the initiation of a serving cell change associated with a UE 102, for example, based on the speed of the UE 102. Similarly, one or more of UEs 102 may include a serving cell management component 104, which may be configured to determine or otherwise obtain a speed of UE 102 and determine whether to suppress initiation of a serving cell change (e.g., suppress transmission of a Proximity Report message to a macro cell access point 105) based on the speed of the UE 102.

Some of the macro access points 105 and/or low power access points 108 may communicate with the UEs 102 under the control of a base station controller (not shown), which may be part of the core network 130 or the certain macro access points 105 (e.g., base stations or eNBs) in various examples. Macro access points 105 and/or low power access points 108 may communicate control information and/or user data with the core network 130 through backhaul links 132. In examples, the macro access points 105 and/or low power access points 108 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 102 and one or more of the macro access points 105 and/or low power access points 108 may be configured to support transmissions on a hierarchical layer that has a reduced latency with respect to another hierarchical layer. In some examples a hybrid UE 102-a may communicate with macro access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 102-a may acknowledge receipt of a transmission by providing ACK/NACK for the transmission through, for example, a HARQ scheme. Acknowledgments from hybrid UE 102-a for transmissions in the first hierarchical layer may be provided, in some examples, after a predefined number of subframes following the subframe in which the transmission was received. The hybrid UE 102-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 102-b may communicate with macro access point 105-b on the second hierarchical layer only. Thus, hybrid UE 102-a and second layer UE 102-b may belong to a second class of UEs 102 that may communicate on the second hierarchical layer, while legacy UEs 102 may belong to a first class of UEs 102 that may communicate on the first hierarchical layer only. Macro access point 105-b and UE 102-b may communicate on the second hierarchical layer through transmissions of subframes of the second subframe type. Macro access point 105-b may transmit subframes of the second subframe type exclusively, or may transmit one or more subframes of the first subframe type on the first hierarchical layer that are time division multiplexed with subframes of the second subframe type. Second layer UE 102-b, in the event that macro access point 105-b transmits subframes of the first subframe type, may ignore such subframes of the first subframe type. Thus, second layer UE 102-b may acknowledge receipt of transmissions in a same subframe as the subframe in which the transmissions are received. Thus, second layer UE 102-b may operate with reduced latency compared to UEs 102 that operate on the first hierarchical layer.

The macro access points 105 and/or low power access points 108 may wirelessly communicate with the UEs 102 via one or more access point antennas. Each of the macro access points 105 sites may provide communication coverage for a respective coverage area associated with a macro cell 110. In some examples, macro access points 105 may be referred to as, simply, a "macro cell," or as a base transceiver station, a radio base station, a radio transceiver, a basic service set (BSS), an extended service set (ESS), a NodeB, eNodeB, or some other suitable terminology. The wireless communications system 100 may include access points of different types (e.g., macro, micro, and/or pico base stations). For instance, wireless communications system 100 may include one or more low power access points 108, each of which may be referred to as a low power cell, femto cell, micro cell, pico cell (or an access point associated with a femto, micro, or pico cell) Closed Subscriber Group (CSG) access point, Home NodeB, a Home eNodeB, or some other suitable terminology. Each of the low power access points 108 may provide communication coverage for a respective coverage area associated with a low power cell 111.

In an aspect, low power access points 108 may provide different access types to UEs 102, which may include open, closed, or hybrid access to a particular set of subscriber UEs. For instance, where the low power access point 108 has a closed access type, a limited number of subscribers with a membership agreement for communication services through the low power access point 108 may be permitted to connect to low power access point 108. Alternatively, where the low power access point has an open access type, the low power access point 108 may provide communication services to any UE 102 registering with the low power access point 108. Furthermore, where the low power access point 108 has a hybrid access type, the low power access point 108 may provide communication services to subscribers of another access point (e.g., a macro access point 105), for instance, with a lower Quality of Service (QoS) than that provided to those in a CSG. Each low power access point 108 may, for example, advertise or otherwise transmit its access type via a System Information Block message (e.g., SIB1 or SIB9).

The macro access points 105 and/or low power access points 108 may also utilize different radio technologies, such as cellular and/or WLAN radio access technologies. The macro access points 105 and/or low power access points 108 may be associated with the same or different access networks or operator deployments. The coverage areas of different macro access points 105 and/or low power access points 108 utilizing the same or different radio technologies, and/or belonging to the same or different access networks, may overlap.

In LTE/LTE-A network communication systems, the terms evolved Node B (eNodeB or eNB) may be generally used to describe the macro access points 105. The wireless communications system 100 may be a Heterogeneous LTE/LTE-A network in which different types of access points provide coverage for various geographical regions. For example, each low power access point 108 may provide communication coverage for a macro cell, a pico cell, a femto cell, and/or other types of cell. Low power cells (or "small cells") such as pico cells, femto cells, micro cells, and/or other types of cells may include low power nodes or LPNs. A macro cell 110 associated with macro access point 105 generally covers a relatively large geographic area (e.g., several kilometers in radius) and may allow unrestricted access by UEs 102 with service subscriptions with the network provider. A low power cell 111 would generally cover a relatively smaller geographic area and may allow unrestricted access by UEs 102 with service subscriptions with the network provider, for example, and in addition to unrestricted access, may also provide restricted access by UEs 102 having an association with the low power cell (e.g., UEs in a closed subscriber group (CSG), UEs for users in the home, and the like). An eNB for a macro cell may be referred to as a macro eNB. An eNB for a low power cell may be referred to as a low power cell eNB. An eNB may support one or multiple (e.g., two, three, four, and the like) cells.

The core network 130 may communicate with the eNBs or other macro access points 105 and/or low power access points 108 via a backhaul 132 (e.g., S1 interface, etc.). The macro access points 105 and/or low power access points 108 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the macro access points 105 and/or low power access points 108 may have similar frame timing, and transmissions from different macro access points 105 and/or low power access points 108 may be approximately aligned in time. For asynchronous operation, the macro access points 105 and/or low power access points 108 may have different frame timing, and transmissions from different macro access points 105 and/or low power access points 108 may not be aligned in time. Furthermore, transmissions in the first hierarchical layer and second hierarchical layer may or may not be synchronized among macro access points 105 and/or low power access points 108. The techniques described herein may be used for either synchronous or asynchronous operations.

The UEs 102 are dispersed throughout the wireless communications system 100, and each UE 102 may be stationary or mobile. A UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 102 may be a cellular phone, a personal digital assistant (PDA), a wireless modem, a wireless communication device, a hand-held device, a tablet computer, a laptop computer, a cordless phone, a wearable item such as a watch or glasses, a wireless local loop (WLL) station, or the like. A UE 102 may be able to communicate with macro access points 105 (e.g., eNodeBs), low power access points 108 (e.g., small cell eNodeBs) relays, and the like. A UE 102 may also be able to communicate over different access networks, such as cellular or other WWAN access networks, or WLAN access networks.

In an aspect of the present disclosure, an example UE 102-c may travel geographically within a macro cell 110-c in a direction 113. While traveling within macro cell 110-c, the UE 102-c may detect the availability of wireless service from a low power cell 111-c (e.g., by receiving a pilot, beacon, or the like transmitted by low power access point 108-c). In an aspect, rather than immediately reselecting or performing handover to low power cell 111-c, the UE 102-c may obtain a speed of the UE 102-c and may determine to suppress an initiation of such reselection or handover based on the speed of the UE 102-c. For instance, where the speed of UE 102-c is determined to be above a speed threshold, UE 102-c may suppress the generation and/or transmission of a Proximity Indication message or Measurement Report to macro access point 105-c.

The communication links 125 shown in wireless communications system 100 may include uplink (UL) transmissions from a UE 102 to macro access points 105 and/or low power access points 108, and/or downlink (DL) transmissions, from an macro access points 105 and/or low power access points 108 to a UE 102. The downlink transmissions may also be called forward link transmissions while the uplink transmissions may also be called reverse link transmissions.

The communications links 125 may carry transmissions of each hierarchical layer which, in some examples, may be multiplexed in the communications links 125. The UEs 102 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the macro access points 105 and/or low power access points 108 and/or multiple antennas on the UEs 102 to transmit multiple data streams. Carrier aggregation may utilize two or more component carriers on a same or different serving cell for data transmission. CoMP may include techniques for coordination of transmission and reception by a number of macro access points 105 and/or low power access points 108 to improve overall transmission quality for UEs 102 as well as increasing network and spectrum utilization.

As mentioned, in some examples macro access points 105, low power access points 108, and/or UEs 102 may utilize carrier aggregation to transmit on multiple carriers. In some examples, macro access points 105, low power access points 108, and/or UEs 102 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 102-a, and/or second layer UE 102-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
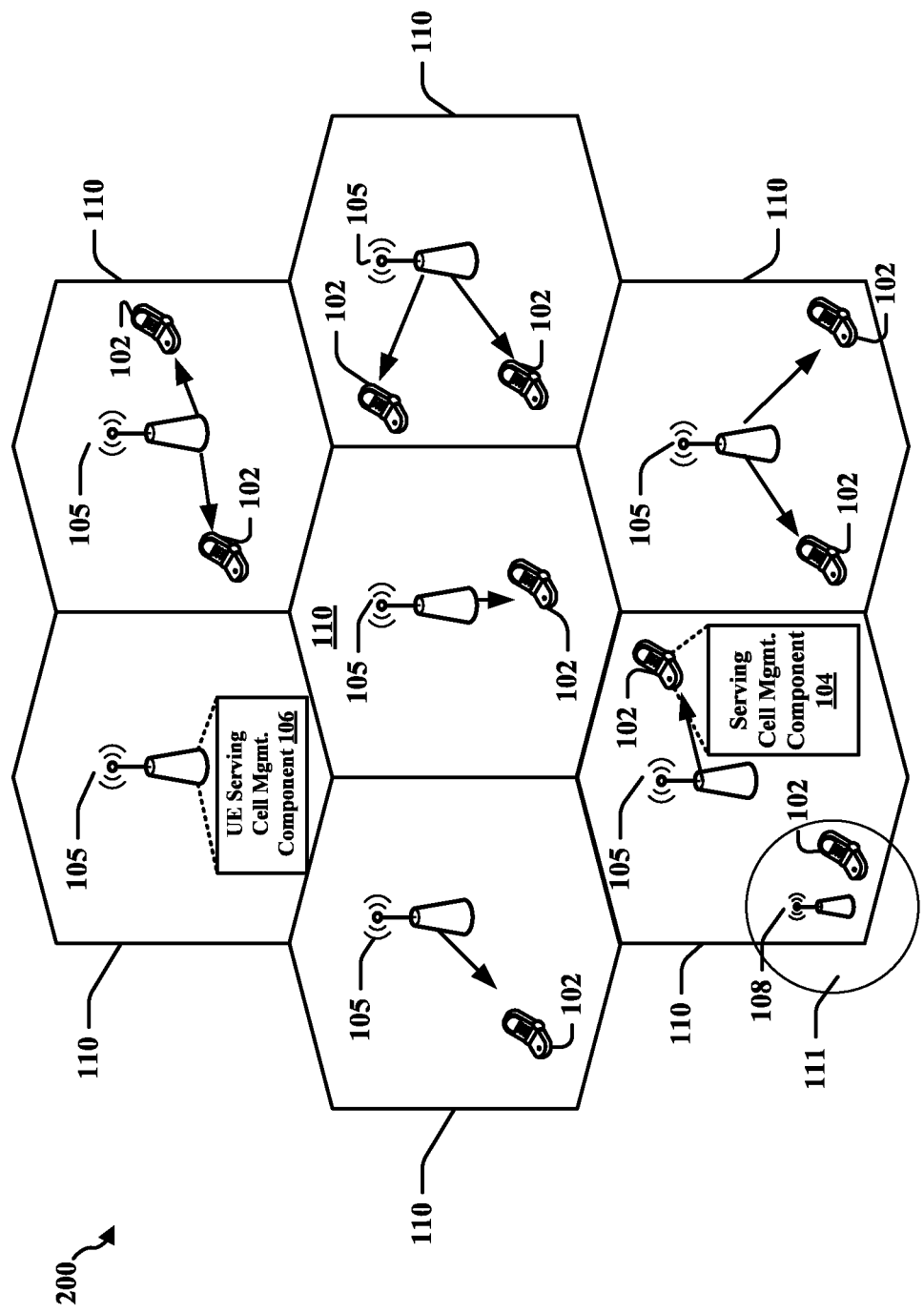
FIG. 2 is a diagram illustrating an example of an access network.

FIG. 2 is a diagram illustrating an example of an access network 200 in an LTE network architecture, which, in some examples, may be included in the wireless communications system 100 of FIG. 1. In this example, the access network 200 is divided into a number of cellular regions (cells) 110. One or more low power access points 108 may have cellular regions (cells) 111 that overlap with one or more of the macro cells 110. The low power access point 108 may be a femto cell (e.g., home eNB (HeNB)), pico cell, micro cell, or remote radio head (RRH). The macro access points 105 are each assigned to a respective cell 110 and are configured to provide an access point to the core network (e.g., core network 130 of FIG. 1) for all the UEs 102 in the cells 110. As introduced in FIG. 1, macro cell access points 105 may include a UE serving cell management component 106 configured to determine a speed of one or more UEs 102 and determine whether to suppress the initiation of a serving cell change associated with a UE 102, for example, based on the speed of the UE 102. Similarly, one or more of UEs 102 may include a serving cell management component 104, which may be configured to determine or otherwise obtain a speed of UE 102 and determine whether to suppress initiation of a serving cell change (e.g., suppress transmission of a Proximity Report message to a macro cell access point 105) based on the speed of the UE 102. There is no centralized controller in this example of an access network 200, but a centralized controller may be used in alternative configurations. The macro access points 105 and low power access points 108 are responsible for all radio related functions including radio bearer control, admission control, mobility control, scheduling, security, and connectivity to a serving gateway (not shown).

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The macro access points 105 and/or low power access points 108, may have multiple antennas supporting MIMO technology. The use of MIMO technology enables the eNBs 105 to exploit the spatial domain to support spatial multiplexing, beamforming, and transmit diversity. Spatial multiplexing may be used to transmit different streams of data simultaneously on the same frequency. The data steams may be transmitted to a single UE 102 to increase the data rate or to multiple UEs 102 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 102 with different spatial signatures, which enables each of the UE(s) 102 to recover the one or more data streams destined for that UE 102. On the UL, each UE 102 transmits a spatially precoded data stream, which enables the macro access points 105 and low power access points 108 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
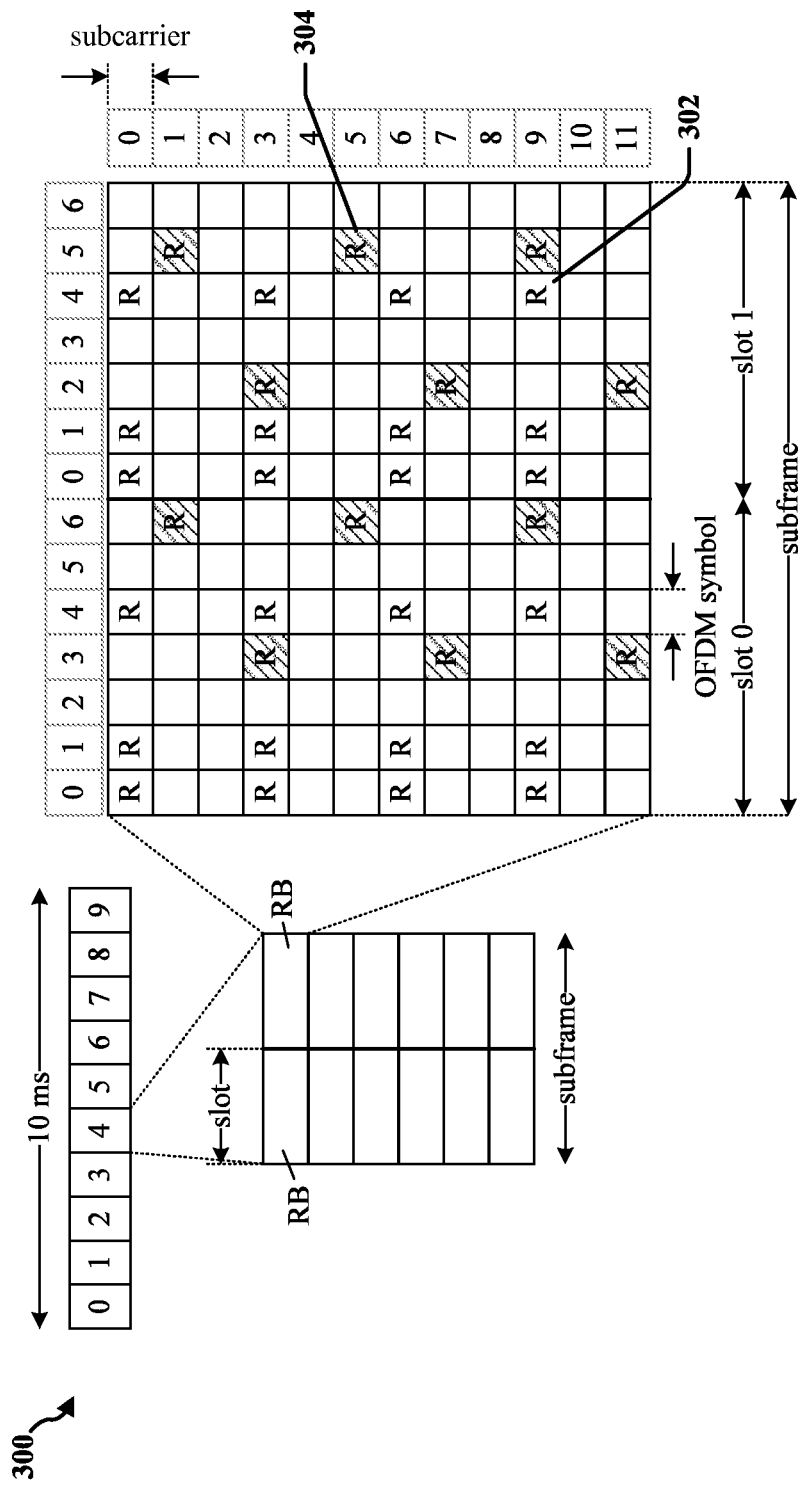
FIG. 3 is a diagram illustrating an example of a DL frame structure in LTE.

FIG. 3 is a diagram 300 illustrating an example of a DL frame structure in LTE, which may be utilized for wireless communication between UEs 102 and macro access points 105 and/or low power access points 108 in the present disclosure. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE, which may be utilized for wireless communication between UEs 102 and macro access points 105 and/or low power access points 108 in the present disclosure. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410*a*, 410*b*, which may vary based on a received transmission window length, in the control section to transmit control information to macro access points 105 and/or low power access points 108. The UE may also be assigned resource element blocks 420*a*, 420*b* in the data section to transmit data to the macro access points 105 and/or low power access points 108. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
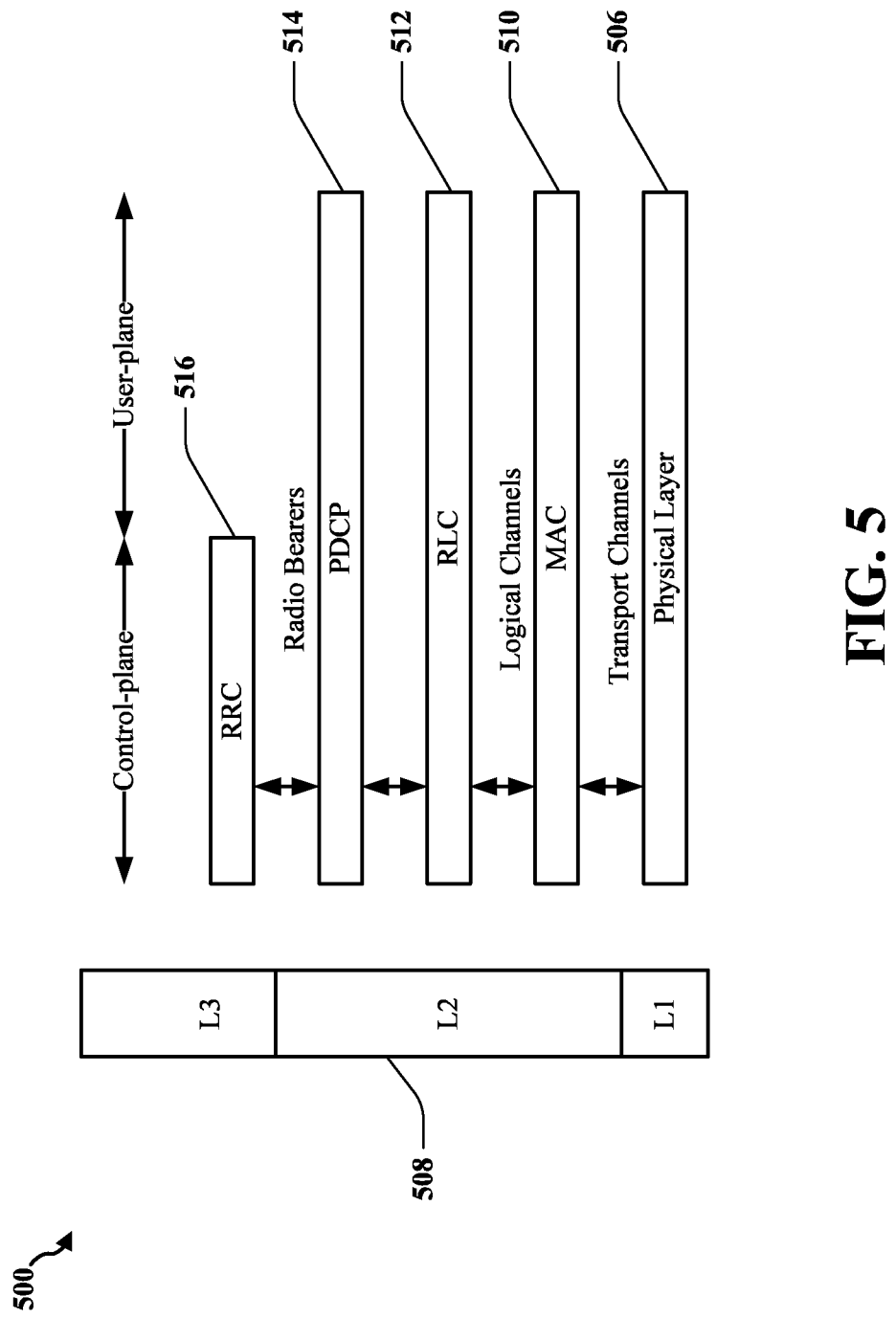
FIG. 5 is a diagram illustrating an example of a radio protocol architecture for the user and control planes.

FIG. 5 is a diagram 500 illustrating an example of a radio protocol architecture for the user and control planes in LTE, which may be utilized for wireless communication between UEs 102 and macro access points 105 and/or low power access points 108 in the present disclosure. The radio protocol architecture for the UE and the macro access points 105 and/or low power access points 108 is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and macro access points 105 and/or low power access points 108 over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the macro access points 105 and/or low power access points 108 on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between macro access points 105 and/or low power access points 108. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and macro access points 105 and/or low power access points 108 is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the macro access points 105 and/or low power access points 108 and the UE.

Figure 6:
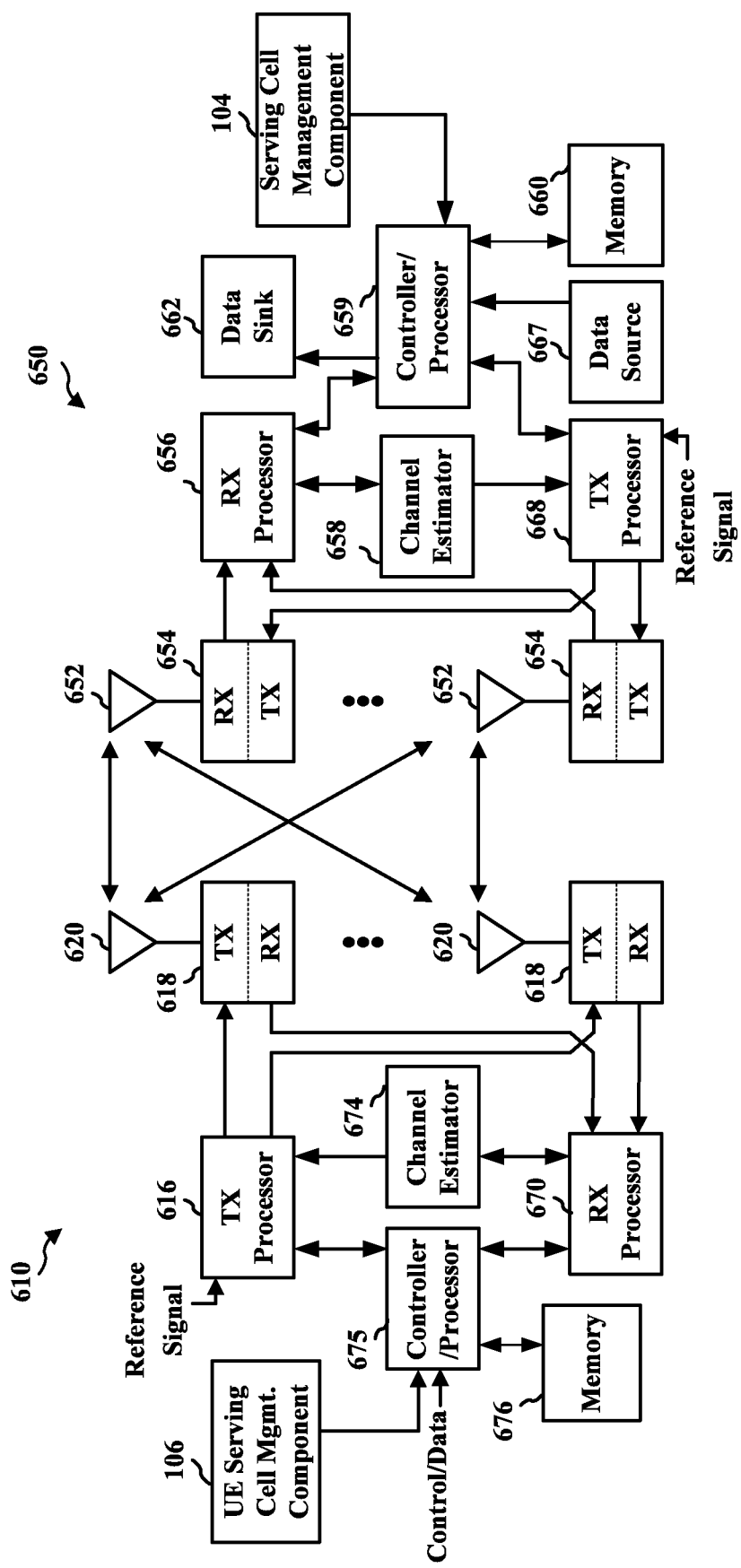
FIG. 6 is a diagram illustrating an example of an evolved Node B and user equipment in an access network.

FIG. 6 is a block diagram of an eNB 610 in communication with a UE 650 in an access network. In an aspect, UE 650 may be UE 102 of FIGS. 1 and 2, and may include a serving cell management component 104 as described herein. In addition, eNB 610 may be macro access point 105 (and/or low power access point 108) of FIGS. 1 and 2, and may include a UE serving cell management component 106 as described herein.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
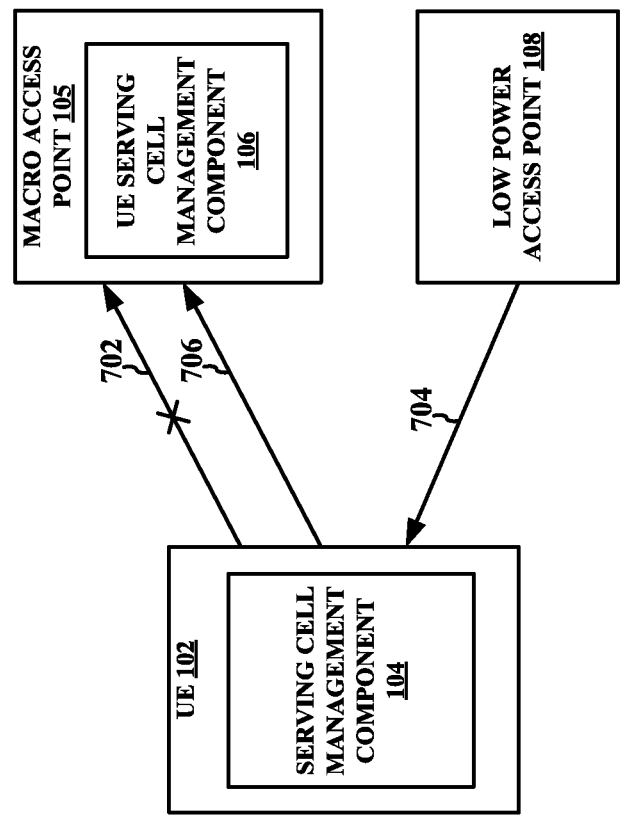
FIG. 7 is a block diagram illustrating devices in a wireless communication environment according to the present disclosure.

FIG. 7 is a block diagram containing a plurality of devices in a wireless communication environment 700 according to the present disclosure. In an aspect, wireless communication environment 700 may include one or more UEs 102, one or more macro access points 105, and one or more low power access points 108 (see, e.g., FIGS. 1 and 2). For purposes of simplicity, only one UE 102, macro access point 105, and low power access point 108 have been presented in FIG. 7, although wireless communication environment 700 may include a plurality of each device.

In an example, macro access point 105 or low power access point 108 may manage a serving cell for UE 102 at a particular time. When the UE 102 is in connected mode, for example, and is conducting a voice or data call, the UE 102 communicates with the serving cell, through which the UE receives wireless service (e.g., receives data from the core network on the DL). As the UE 102 moves geographically through wireless communication environment 700, the serving cell may be altered as network conditions change along with the movement of the UE 102. For instance, when a macro cell associated with macro access point 105 is the serving cell at a first point in time, at a second point in time the UE 102 may have moved within a coverage area of a low power cell managed by low power access point 108.

According to legacy LTE procedures, the UE 102 would be required to prioritize cells associated with the low power access point 108 over the macro access point 105 for handover or reselection. However, in an aspect of the present disclosure, serving cell management component 104 of UE 102 and/or UE serving cell management component 106 may be configured to to suppress the initiation of a reselection or handover procedure based on a speed of UE 102, as the UE 102 may be moving so fast that it enters and exits the coverage area of the low power cell before the reselection and/or handover can be performed or where the benefits of the reselection are outweighed by the relatively short amount of time that the low power cell will serve as the serving cell. In other words, where the speed of UE 102 is greater than a threshold value, the initiation of reselection or handover procedures for changing the serving cell from a macro cell to the low power cell may be suppressed to avoid unnecessary signaling and processing involved with the handover or reselection procedure.

In legacy LTE procedures, a UE 102 on an active call (i.e., in connected mode) with a macro cell informs the macro access point 105 that the UE 102 has detected the presence of a low power cell (e.g., managed by low power access point 108) by transmitting a Proximity Indication message 702 that initiates the handover procedure for handing the UE 102 and the ongoing call over to the low power cell In some legacy examples, the UE 102 may only send the Proximity Indication message 702 where the low power cell is a CSG cell having a CSG identifier that is in a whitelist of the UE 102. In other words, in legacy LTE, the UE 102 may generate and transmit the Proximity Indication message 702 exclusively when the UE 102 is a member of the CSG of the low power cell. Furthermore, in response to receiving the Proximity Indication message 702 in legacy LTE procedures, the macro access point 105 may reply with an RRC Connection Reconfiguration message, which serves to request the UE 102 to perform pilot or beacon measurement of the low power cell and prepare for handover. In an aspect of the present disclosure, a serving cell management component 104 of UE 102 may be configured to suppress the initiation of a handover procedure by determining that a speed of the UE 102 is greater than a threshold value (or the UE 102 has a particular high speed profile) and suppressing the transmission of the Proximity Indication message 702 to macro access point 105 (as indicated in FIG. 7 by the "X" through Proximity Indication message 702), thereby suppressing the handover procedure.

Similarly, in an aspect of the present disclosure, the UE 102 (e.g., via serving cell management component 104) may be configured to suspend reselection procedures based on a speed of the UE 102. For instance, where the UE 102 is in idle mode and is camped on a macro cell associated with macro access point 105, the UE 102 may perform a cell search procedure and may determine the presence of a low power cell associated with low power access point 108 by receiving a pilot or beacon signal 704 transmitted by low power access point 108. The serving cell management component 104 may utilize one or more processes to determine the speed of UE 102 (or a speed profile of the UE 102). Where the speed of the UE 102 exceeds a threshold value or the speed profile of the UE 102 is a "high speed" profile, the UE 102 may suppress reselection from the macro cell to the low power cell.

In an additional aspect, macro access point 105 (e.g., via UE serving cell management component 106) may be configured to determine or otherwise obtain the speed of the UE 102 and may be configured to suppress a handover to a low power access point based on the obtained speed of the UE 102. For instance, in an aspect, where the UE 102 is in a connected mode with the macro access point 105 managing the serving cell of UE 102, the macro access point 105 may receive a Proximity Indication message 702 and/or a measurement report 706 from UE 102, which, under legacy LTE processes, would trigger a handover procedure to the low power cell. According to the present disclosure, however, the macro access point 105 may determine whether the speed of UE 102 exceeds a threshold value. Where the speed of the UE 102 exceeds the threshold value, the macro access point 105, via UE serving cell management component 106, may suspend handover to the low power cell managed by low power access point 108. Serving cell management component 104, UE serving cell management component 106, and methods performed thereby will be described in further detail in references to the figures below.

Figure 8:
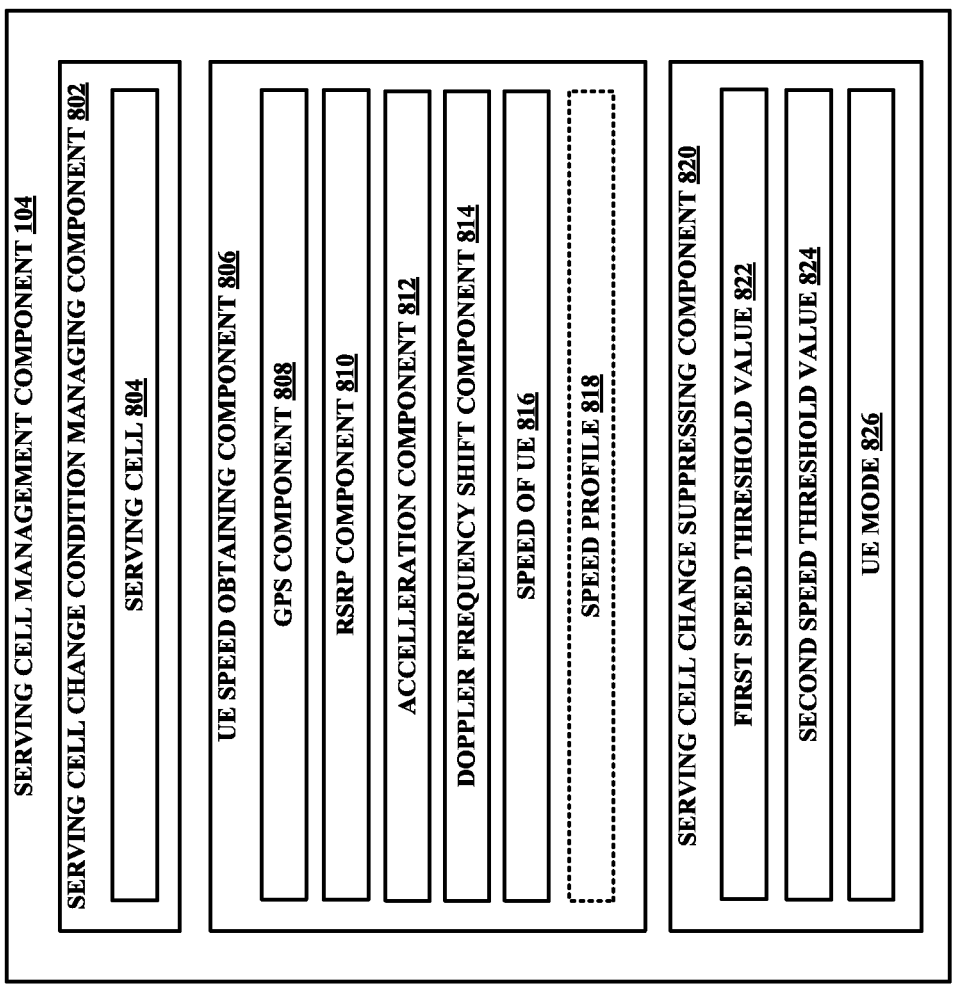
FIG. 8 is a diagram illustrating an example serving cell management component of a UE configured to implement aspects of the present disclosure.

FIG. 8 is a block diagram containing a plurality of sub-components of a serving cell management component 104 (see FIGS. 1, 2, and 7), which may be implemented by a UE 102 for determining a speed of UE 102 and managing cell reselection and/or handover based on the speed of UE 102. In an aspect, serving cell management component 104 may include a serving cell change condition managing component 802, which may be configured to determine that a serving cell change condition exists for an initiation of a serving cell change for a UE. For instance, in some examples, the serving cell change may involve changing a serving cell 804 of the UE 102 from a macro cell to a low power cell. In some examples, the UE 102 may monitor one or more frequencies and may receive a pilot or beacon signal transmitted by a low power cell, and may therefore determine that wireless service via the low power cell is available. As such, according to an aspect of the present disclosure, the serving cell change condition may exist when such a pilot or beacon signal is received. Therefore, serving cell change condition managing component 802 may be configured to determine that the serving cell change condition exists where a pilot, beacon, or other service-advertising signal is detected or received by the UE 102.

In an additional aspect, serving cell management component 104 may include a UE speed obtaining component 806, which may be configured to obtain a speed 816 of the UE 102 (which may be referred to herein as "UE speed" or the like). In addition, although the speed 816 of the UE 102 may be a discrete speed represented in a numerical value (e.g., meters per second, miles per hour, or the like), the geographical movement of the UE 102 may optionally (as represented by dotted line in block 818) be represented by a speed profile 818. In an aspect, the speed profile 818 may include a speed class, speed range, or speed characterization of the UE 102 at a particular time. For instance, the speed profile 818 may comprise a stationary, low speed, moderate speed, high speed, or other classification or profile type. In addition, the speed profile 818 may be based on a range of values of the speed 816 of UE 102 as represented by a discrete speed value.

UE speed obtaining component 806 may include several sub-components for determining or otherwise obtaining the speed 816 of UE 102. For instance, UE speed obtaining component may include a Global Positioning Service (GPS) component 808, which may be configured to determine the speed 816 of the UE by utilizing GPS data. For instance, GPS component 808 may be configured to obtain GPS coordinates associated with the UE 102 over several time instances and determine the UE speed 816 based on the GPS coordinates and the time interval between measurements.

In addition, UE speed obtaining component 806 may include a Reference Signal Received Power (RSRP) component 810, which may be configured to obtain the UE speed 816 based on a reference signal transmitted by a macro cell access point 105 or low power access point 108. Specifically, the RSRP component 810 may be configured to receive one or more reference signals from the macro cell access point 105 or low power access point 108 at a plurality of time instances and may determine a change rate or standard deviation of a difference in calculated RSRPs to estimate the speed 816 of UE 102 and/or establish a speed profile 818 of the UE.

Furthermore, UE speed obtaining component 806 may include a acceleration component 812, which may be configured to determine a UE speed 816 or speed profile 818 based on readings by one or more acceleration sensors of the UE 102. In other words, the acceleration component 812 may receive readings from one or more acceleration sensors (e.g., three-axis accelerometers) and may determine whether the speed profile comprises one of stationary, low speed, moderate speed, high speed, walking, running, resting, standing, sitting, parking, driving, or any other general classification of UE speed, movement, or action.

In an additional aspect, UE speed obtaining component 806 may include a Doppler frequency shift component 814, which may be configured to determine the speed 816 of UE 102 based on a Doppler frequency shift of one or more signals received from a macro cell access point 105 or low power access point 108. For instance, the one or more signals may include a Common Reference Signal (CRS) transmitted by the macro cell access point 105 or low power access point 108. Particularly, the Doppler frequency shift component 814 may compare a center frequency of a communication system (e.g., an LTE center frequency) to a determined frequency of the received signal or signals to determine the frequency shift. Thereafter, the speed 816 of the UE 102 may be determined from the determined frequency shift. Particularly, the Doppler frequency shift component may determine a UE speed 816 based on the following algorithm:

$$v = \frac{f_{shift} \times c}{f_{center}}$$

where v represents UE speed 816, $f_{shift}$ represents the frequency shift, $f_{center}$ represents the center frequency, and c represents the speed of light. For instance, in a particular example, where an LTE center frequency is 700 MHz and a frequency shift of 70 Hz is determined by Doppler frequency shift component 814, the UE speed 816 may be determined to be 67.5 mph.

In addition, serving cell management component 104 may include a serving cell change suppressing component 820, which may be configured to suppress the initiation of the serving cell change based on the speed 816 of the UE 102 and/or the speed profile 818 determined by UE speed obtaining component 806. In an aspect, the serving cell change suppressing component 820 may suppress the initiation of the serving cell change by suppressing the generation and/or transmission of a Proximity Indication message, which indicates that the UE has determined the presence of a low power cell. Furthermore, the serving cell change suppressing component 820 may be configured to compare the determined UE speed 816 to a speed threshold value, such as first speed threshold value 822, to determine whether to suppress the serving cell change (e.g., cell reselection or handover). For instance, serving cell change suppressing component 820 may be configured to suppress the initiation of the serving cell change based on determining that the speed 816 of the UE 102 exceeds the first speed threshold value 822.

In an additional aspect, the serving cell change suppressing component 820 may maintain a second speed threshold value 824. In some examples, the serving cell change suppressing component 820 may continue to compare the UE speed 816 to the second speed threshold value 824 after the initial comparison of the UE speed 816 to first speed threshold value 822, and if the UE speed 816 drops below the second speed threshold value 824, the UE 102 may initiate the serving cell change procedure (e.g., may transmit a Proximity Indication message to a macro access point 105). In some examples, the first speed threshold value 822 and the second speed threshold value 824 may be the same value or may be different values.

Furthermore, the first speed threshold value 822 and/or the second speed threshold value 824 may comprise discrete speed values (e.g., values in miles per hour, meters per second, etc.) and may be static or dynamic. In other words, the values may be permanent and preconfigured by a network or user or may be changed over time. In addition, each of the threshold values may be threshold speed profiles 818. In other words, in a non-limiting aspect, the first speed threshold value 822 may be a "high speed" speed profile and the second speed threshold value 824 may be a "stationary" speed profile, or the like.

In an additional aspect, the serving cell change suppressing component 820 may determine whether to suppress the initiation of a serving cell change procedure based on a UE mode 826, which may include a connected mode, idle mode, or any other UE mode recognized by one of ordinary skill in the art. In some examples, the serving cell change suppressing component 820 may be configured to suppress the initiation of the serving cell change (e.g., performing cell reselection) based at least in part on determining that the UE is in the idle mode. In other examples, the serving cell change suppressing component 820 may be configured to suppress the initiation of the serving cell change (e.g., performing handover) based at least in part on determining that the UE 102 is in a connected mode, whereby the UE 102 is connected to, or conducting data exchange (e.g., a data session, voice call, or the like) with a macro access point 105.

Figure 9:
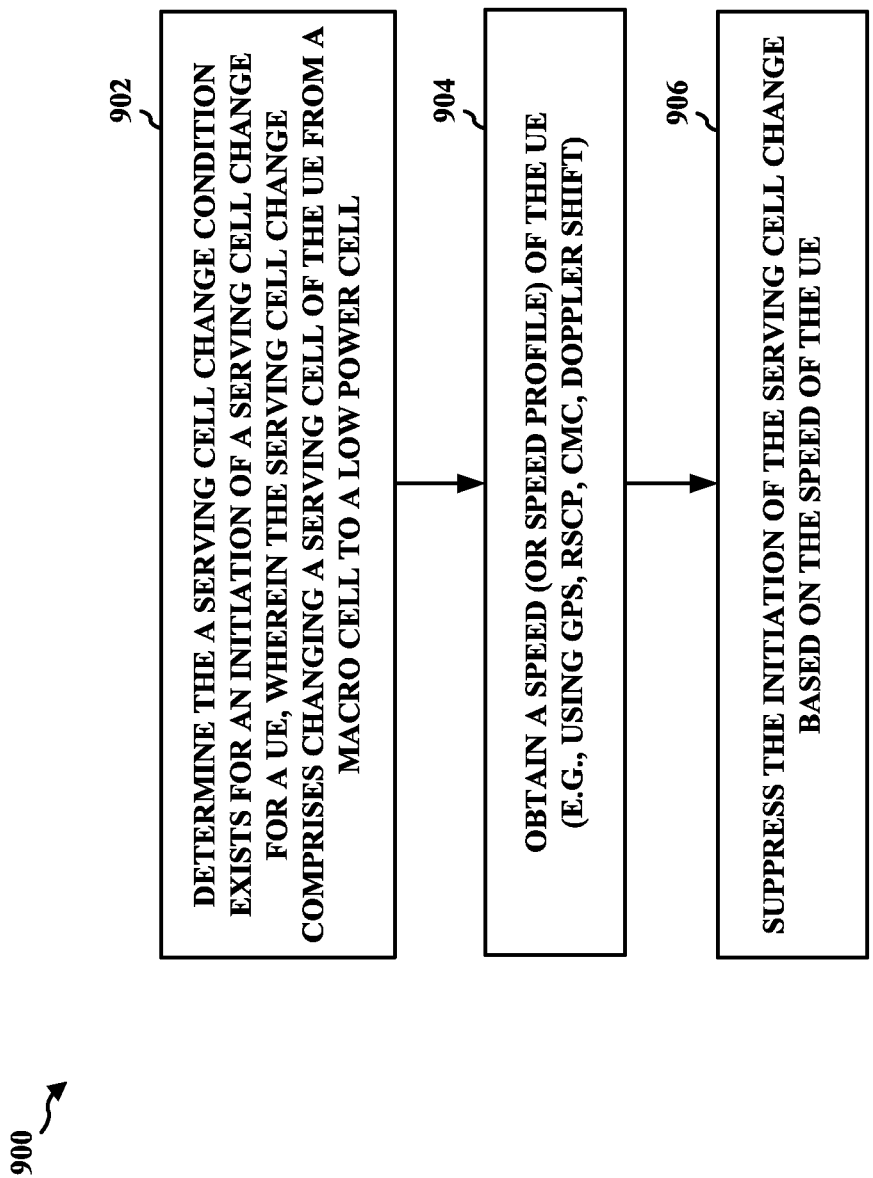
FIG. 9 is a flow chart of a method of serving cell management performed by a UE in a wireless communication system.

FIG. 9 illustrates an example method 900 of the present disclosure, which may comprise a method of serving cell management at a UE 102. In an aspect, method 900 may include, at block 902, determining a serving cell change condition exists for an initiation of a serving cell change for the UE 102. The serving cell change condition may include a condition whereby it is determined that a low power cell is available for wireless communication services. Additionally, in some examples, the serving cell change may include changing a serving cell of the UE from a macro cell to a low power cell. Furthermore, block 902 of method 900 may be performed, in some examples, by serving cell change condition managing component 802.

In an additional aspect, method 900 may include, at block 904, obtaining a speed of the UE 102. In various examples contemplated by the present disclosure, the speed of the UE 102 may be obtained using GPS data, RSRP data, acceleration data, and/or Doppler frequency shift data. For instance, in an aspect, block 904 may include obtaining GPS data (e.g. GPS coordinates) at a plurality of time instances and estimating the UE speed based upon the GPS data. Alternatively or additionally, block 904 may include obtaining a reference signal from a macro access point 105 or low power access point 108 and determining an RSRP change rate or standard deviation of RSRP to estimate the UE speed. Furthermore, block 904 may include utilizing one or more acceleration sensors in the UE to determine a speed or speed profile of the UE. Moreover, block 904 may include computing a Doppler frequency shift of a signal received from a macro access point 105 or low power access point 108 (e.g., a CRS) to estimate or otherwise determine the speed of the UE. In an aspect, block 904 may be performed by UE speed obtaining component 806 and/or one or more subcomponents thereof, as detailed above in reference to FIG. 8.

In a further aspect, method 900 may include, at block 906, suppressing the initiation of the serving cell change based on the speed of the UE, which may include comparing a determined UE speed to one or more threshold values. Furthermore, in some examples, block 906 may include suppressing the initiation of the service cell change further based on a UE mode, such as a connected mode or idle mode. For instance, in some examples, block 906 may include determining that the speed of the UE exceeds a speed threshold value and suppressing the initiation of the serving cell change based on determining that the speed of the UE exceeds the speed threshold value. Additionally, block 906 may further include determining that the UE is in an idle mode and, further, suppressing the initiation of the serving cell change based on determining that the UE is in the idle mode. In such a case, suppressing the initiation of the serving cell change may comprise suppressing the initiation of a cell reselection procedure. In other example scenarios, block 906 may include determining that the UE is in a connected mode (i.e., is communicating wirelessly with a macro access point 105 on an active voice or data call), and suppressing the initiation of the serving cell change may comprise suppressing the generation and/or transmission of a Proximity Indication message to a network entity associated with the macro cell. Furthermore, in an aspect, block 906 may be performed by serving cell change suppressing component 820 of FIG. 8.

Figure 10:
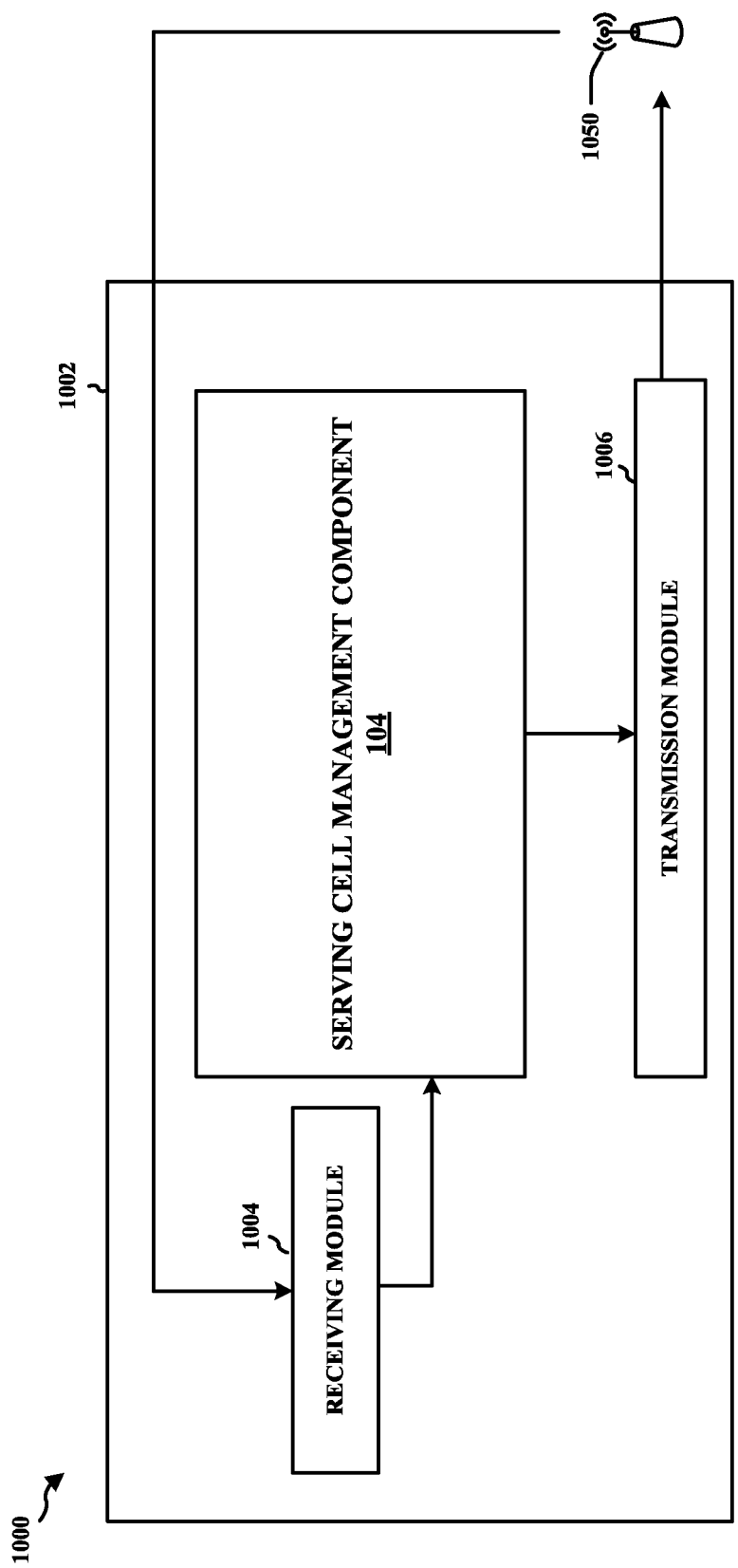
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a UE (e.g., UE 102 of the present disclosure). The apparatus includes a module 1004 that is configured to receive data (e.g., sent to apparatus 1002 by network entities (i.e., access points) and/or other UEs), serving cell management component 104 (see, e.g., FIG. 8), and a transmission module 1006 that is configured to transmit wireless data and/or control information to one or more network entities (e.g., macro access point 105 and/or low power access point 108).

The apparatus may include additional modules that perform each of the steps of the algorithm in the aforementioned flow chart of FIG. 9. As such, each step in the aforementioned flow charts of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
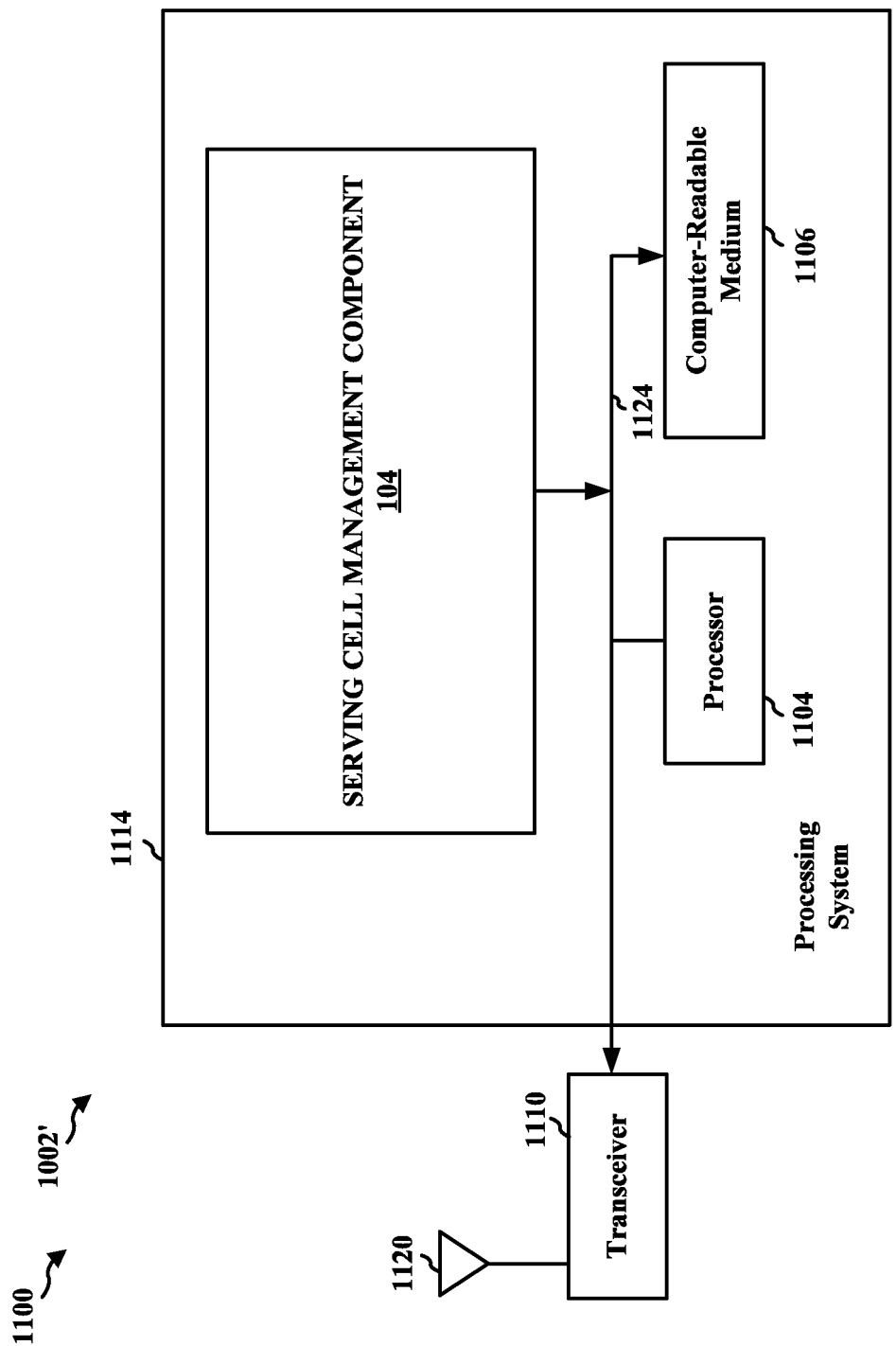
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the serving cell management component 104, and the computer-readable medium 1106, which may comprise a non-transitory computer-readable medium storing computer-executable code for performing aspects of method 900 of FIG. 9. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. In addition, the transceiver 1110 may include transmission module 1006 of FIG. 10. The processing system 1114 includes a processor 1104 coupled to a computer-readable medium 1106. The processor 1104 is responsible for general processing, including the execution of computer-executable code stored on the computer-readable medium 1106. The computer-executable code, when executed by the processor 1104, causes the processing system 1114 to perform the various functions described supra for any particular apparatus. The computer-readable medium 1106 may also be used for storing data that is manipulated by the processor 1104 when executing computer-executable code. The processing system further includes a serving cell management component (see, e.g., FIG. 8). The modules/components may be computer-executable code modules running in the processor 1104, resident/stored in the computer-readable medium 1106, one or more hardware modules coupled to the processor 1104, or some combination thereof.

In one configuration, the apparatus 1002' for wireless communication includes means for determining a serving cell change condition exists for an initiation of a serving cell change for the UE (e.g., wherein the serving cell change comprises changing a serving cell of the UE from a macro cell to a low power cell); means for obtaining a speed of the UE; and means for suppressing the initiation of the serving cell change based on the speed of the UE. The aforementioned means may be one or more of the aforementioned modules of the apparatus 1002 and/or the processing system 1114 of the apparatus 1002' configured to perform the functions recited by the aforementioned means.

Figure 12:
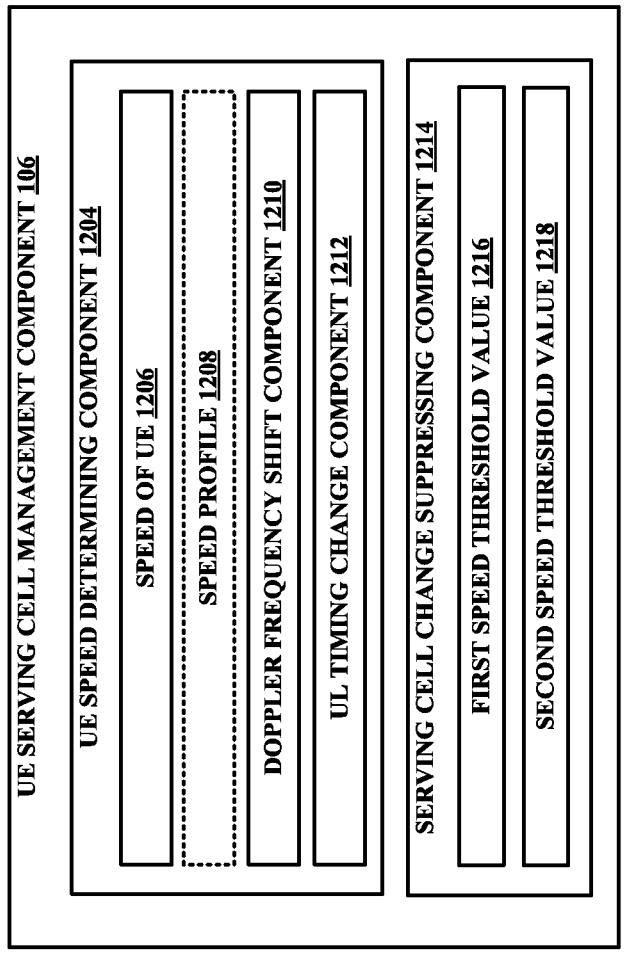
FIG. 12 is a diagram illustrating an example UE serving cell management component configured to implement aspects of the present disclosure.

The present disclosure now turns to aspects of serving cell change management that may be performed by a network entity, such as, but not limited to, a macro access point 105. FIG. 12 is a block diagram containing a plurality of sub-components of a UE serving cell management component 106 (see FIGS. 1 and 2), which may be implemented by a macro access point 105 for suppressing the initiation of a serving cell change associated with a UE 102 based on the speed of the UE. In an aspect, UE serving cell management component 106 may include a UE speed determining component 1204, which may be configured to obtaining a speed 1206 of a UE 102 (which may be alternatively referred to herein as "UE speed") with which a macro access point is in communication. In addition, although the speed 1206 of the UE 102 may be a discrete speed represented in a numerical value (e.g., meters per second, miles per hour, or the like), the geographical movement of the UE 102 may optionally (as represented by dotted line in block 1208) be represented by a speed profile 1208. In an aspect, the speed profile 1208 may include a speed class, speed range, or speed characterization of the UE 102 at a particular time. For instance, speed profile 1208 may comprise a stationary, low speed, moderate speed, high speed, or other classification or profile type. In addition, the speed profile 1208 may be based on a range of values of the speed 1206 of UE 102 as represented by a discrete speed value.

In an aspect, UE speed determining component 1204 may include a Doppler frequency shift component 1210, which may be configured to determine a UE speed 1206 based on a Doppler frequency shift of one or more signals received from a UE 102. For instance, the one or more signals may include a Sounding Reference Signal (SRS) transmitted by the UE 102. Particularly, the Doppler frequency shift component 1210 may compare a center frequency of a communication system (e.g., an LTE center frequency) to a determined frequency of the received SRS signal to determine the frequency shift. Thereafter, the speed 1206 of the UE 102 may be determined from the determined frequency shift. Particularly, the Doppler frequency shift component may determine a UE speed 1206 based on the following algorithm:

$$v = \frac{f_{shift} \times c}{f_{center}}$$

where v represents UE speed 816, $f_{shift}$ represents the frequency shift, $f_{center}$ represents the center frequency, and c represents the speed of light.

In addition, UE speed determining component 1204 may include an uplink (UL) timing change component 1212, which may be configured to determine the UE speed 1206 (or speed profile 1208) based on a timing change of one or more signals transmitted by the UE 102 on the uplink. In an aspect, the UL timing change component 1212 may be configured to decipher or otherwise determine an uplink timing or uplink timing schedule associated with uplink data or control transmissions at a plurality of time instances. Based on any change in UL timing, the UL timing change component 1212 may determine the UE speed 1206 according to one or more algorithms. For instance, in an aspect, UL timing change component 1212 may determine the UE speed 1206 according to the following algorithm:

$$v = \frac{\Delta t_{UL} \times c}{\Delta T}$$

where v represents UE speed 1206, $\Delta t_{UL}$ represents the UL timing change over a time period $\Delta T$ between UL timing measurements, and c represents the speed of light.

In an additional aspect, UE serving cell management component 106 may include a serving cell change suppressing component 1214, which may be configured to suppress the initiation of the serving cell change based on the speed 1206 of the UE 102. In an example, when a macro access point 105 is in communication with a UE 102 (e.g., on an active voice or data call), the UE 102 may be considered to be in a connected mode. When in the connected mode, the UE 102 may move into the serving area of a low power cell, and, based on legacy LTE procedures, the UE 102 may generate and transmit a Proximity Indication message to the macro access point 105. The Proximity Indication message serves to inform the macro access point 105 of the presence of the low power cell and to initiate a serving cell handover procedure from the macro cell associated with macro access point 105 to the low power cell. In an aspect of the present disclosure, however, the serving cell change suppressing component 1214 may suppress the initiation of the serving cell change by suppressing initiation of a handover procedure after receiving a Proximity Indication message from a UE 102, which indicates that the UE has determined the presence of a low power cell.

Furthermore, the serving cell change suppressing component 1214 may be configured to compare the determined UE speed 1206 to a speed threshold value, such as first speed threshold value 1216, to determine whether to suppress the serving cell handover procedure. For instance, serving cell change suppressing component 1214 may be configured to suppress the initiation of the serving cell change based on determining that the speed 1206 of the UE 102 exceeds the first speed threshold value 1216.

In an additional aspect, the serving cell change suppressing component 1214 may maintain a second speed threshold value 1218. In some examples, the serving cell change suppressing component 1214 may continue to compare the UE speed 1206 to the second speed threshold value 1218 after the initial comparison of the UE speed 1206 to first speed threshold value 1216, and if the UE speed 1206 drops below the second speed threshold value 1218, the UE serving cell management component 106 may initiate the serving cell handover procedure (e.g., by transmitting an RRC Connection Reconfiguration message to the UE 102). In some examples, the first speed threshold value 1216 and the second speed threshold value 1218 may be the same value or may be different values.

Furthermore, the first speed threshold value 1216 and/or the second speed threshold value 1218 may comprise discrete speed values (e.g., values in miles per hour, meters per second, etc.) and may be static or dynamic. In other words, the values may be permanent and preconfigured by a network or user or may be changed over time. In addition, each of the threshold values may be threshold speed profiles 1208. In other words, in a non-limiting aspect, the first speed threshold value 1216 may be a "high speed" speed profile and the second speed threshold value 1218 may be a "stationary" speed profile, or the like.

In some examples, the serving cell change suppressing component 1214 may be configured to suppress the initiation of the serving cell change (e.g., performing handover) based at least in part on determining that the UE 102 is in a connected mode, whereby the UE 102 is connected to, or conducting data exchange (e.g., a data session, voice call, or the like) with a macro access point 105.

Figure 13:
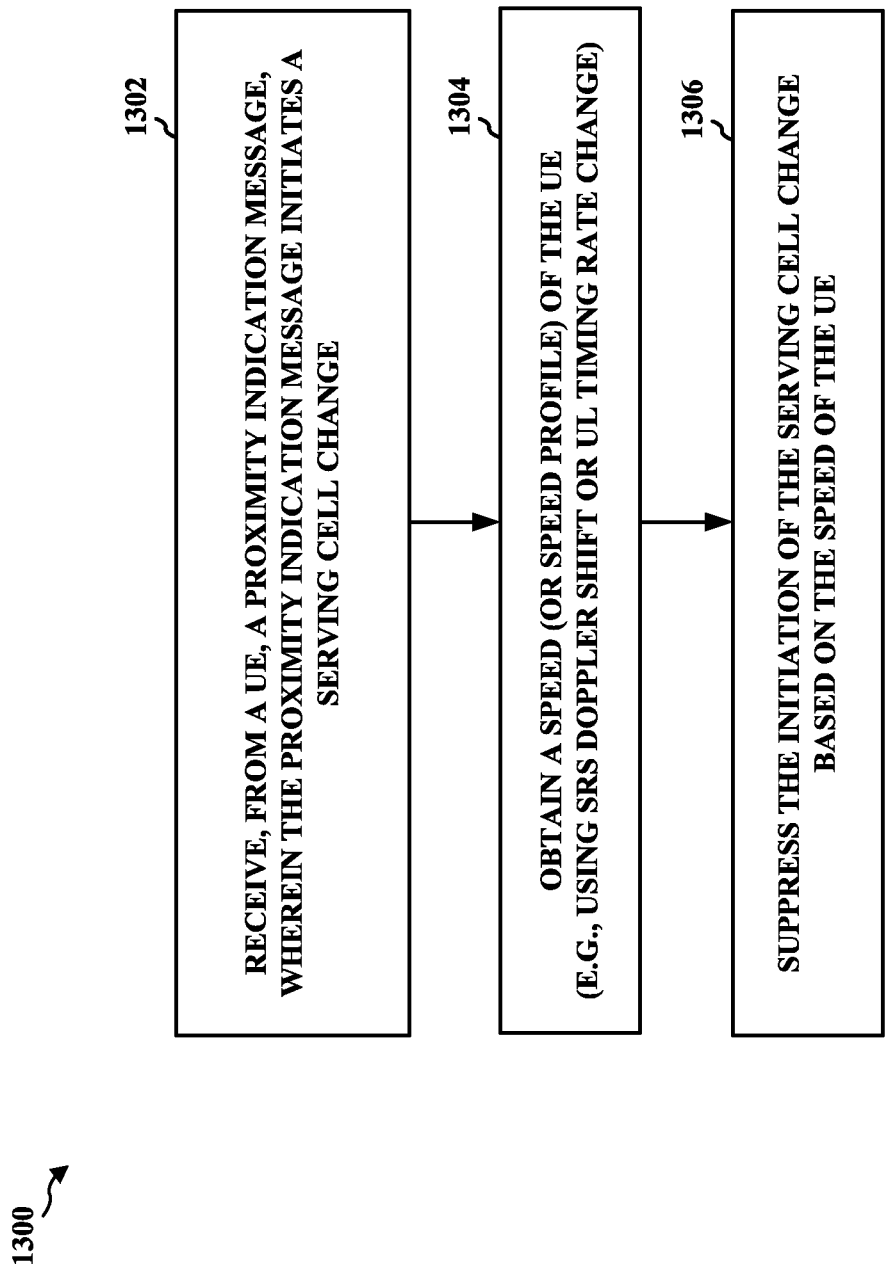
FIG. 13 is a flow chart of a method of serving cell management performed by a network entity in a wireless communication system.

FIG. 13 illustrates an example method 1300 of the present disclosure, which may be performed by a network entity (e.g., a macro access point 105) or a component thereof. For example, in an aspect, at block 1302, method 1300 may include receiving, from a UE, a Proximity Indication message. In an aspect, receiving the Proximity Indication message initiates a serving cell change procedure according to legacy LTE methods. Furthermore, block 1302 of method 1300 may be performed by receiving module 1404 of FIG. 14, transceiver 1510 of FIG. 15, and/or any other hardware or circuitry configured to receive and/or process wireless signals.

Additionally, method 1300 may include, at block 1302, obtaining a speed of the UE. In an aspect, block 1304 may be performed by UE speed determining component 1204 of FIG. 12 and/or one or more subcomponents thereof. Furthermore, though not specifically shown in FIG. 13, block 1302 may include computing a Doppler shift of a SRS transmitted by the UE and determining the speed of the UE as a function of the Doppler shift. Moreover, block 1302 may include detecting an uplink timing change associated with the UE and determining the speed of the UE based on the uplink timing change.

In a further aspect, method 1300 may include, at block 1306, suppressing the initiation of the serving cell change based on the speed of the UE, which may include comparing a determined UE speed to one or more threshold values. Furthermore, in some examples, block 1306 may include suppressing the initiation of the service cell change based on determining that the UE is in a connected mode with a macro access point. For instance, in some examples, block 1306 may include determining that the speed of the UE exceeds a speed threshold value and suppressing the initiation of the serving cell change based on determining that the speed of the UE exceeds the speed threshold value. In addition, block 1306 may include suppressing the initiation of the serving cell change until the UE speed is determined to be below a second speed threshold value.

Additionally, block 1306 may include determining that the UE is in a connected mode (i.e., is communicating wirelessly with a macro access point 105 on an active voice or data call). When a determination is made that the UE is in the connected mode, block 1306 may include suppressing the initiation of a cell handover procedure, for example, to a discovered low power cell. Furthermore, in an aspect, block 906 may be performed by serving cell change suppressing component 1214 of FIG. 12.

Figure 14:
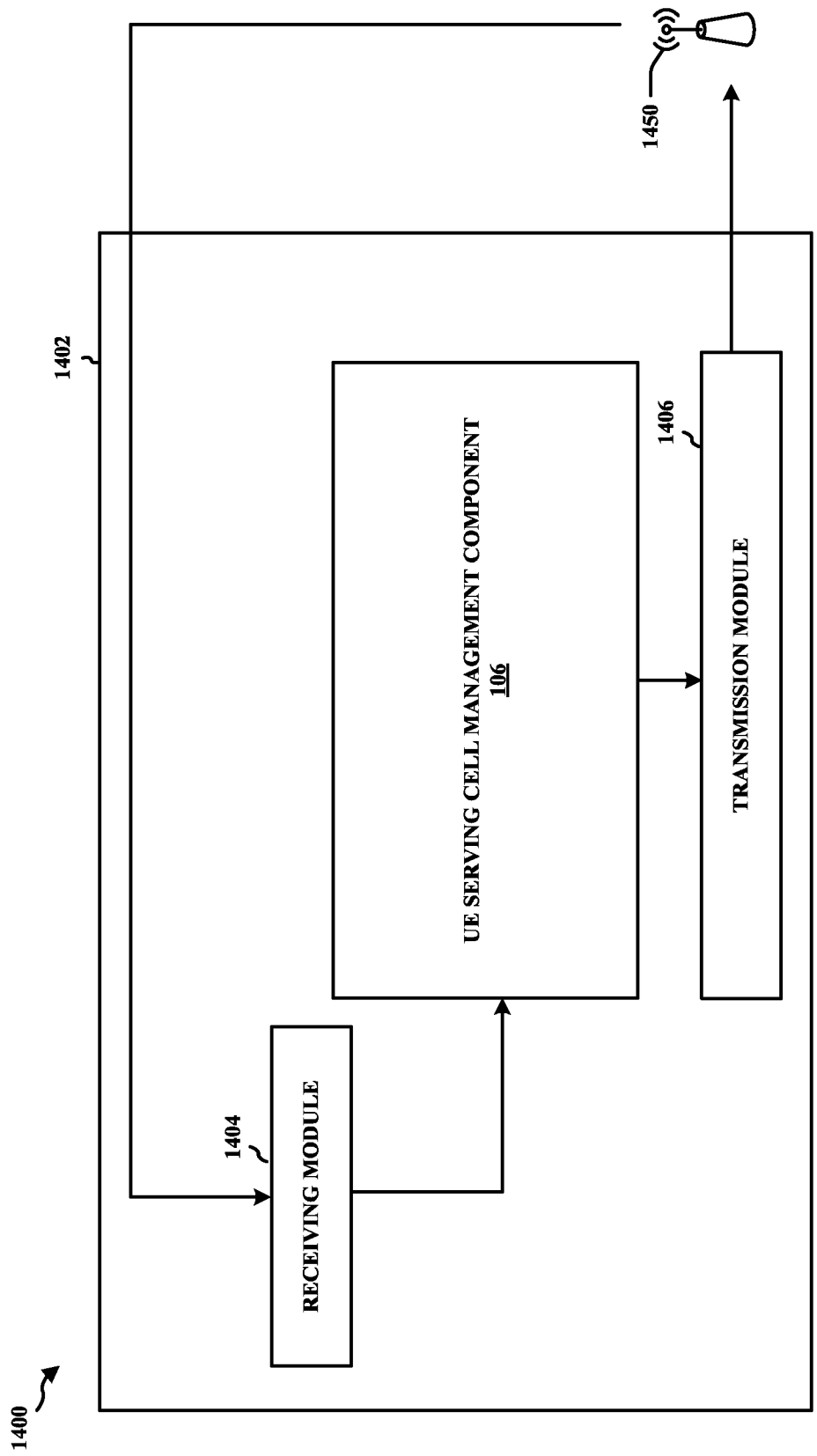
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a network entity, such as the macro access point 105 of FIGS. 1 and 2. The apparatus includes a receiving module 1404 that is configured to receive wireless signals (e.g., control or data signals). For instance, in an aspect, receiving module 1404 may be configured to receive, from a UE, a Proximity Indication message, wherein the Proximity Indication message initiates a serving cell change (e.g., under legacy LTE procedures).

The apparatus may include additional modules that perform each of the steps of the algorithm in the aforementioned flow chart of FIG. 13. As such, each step in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
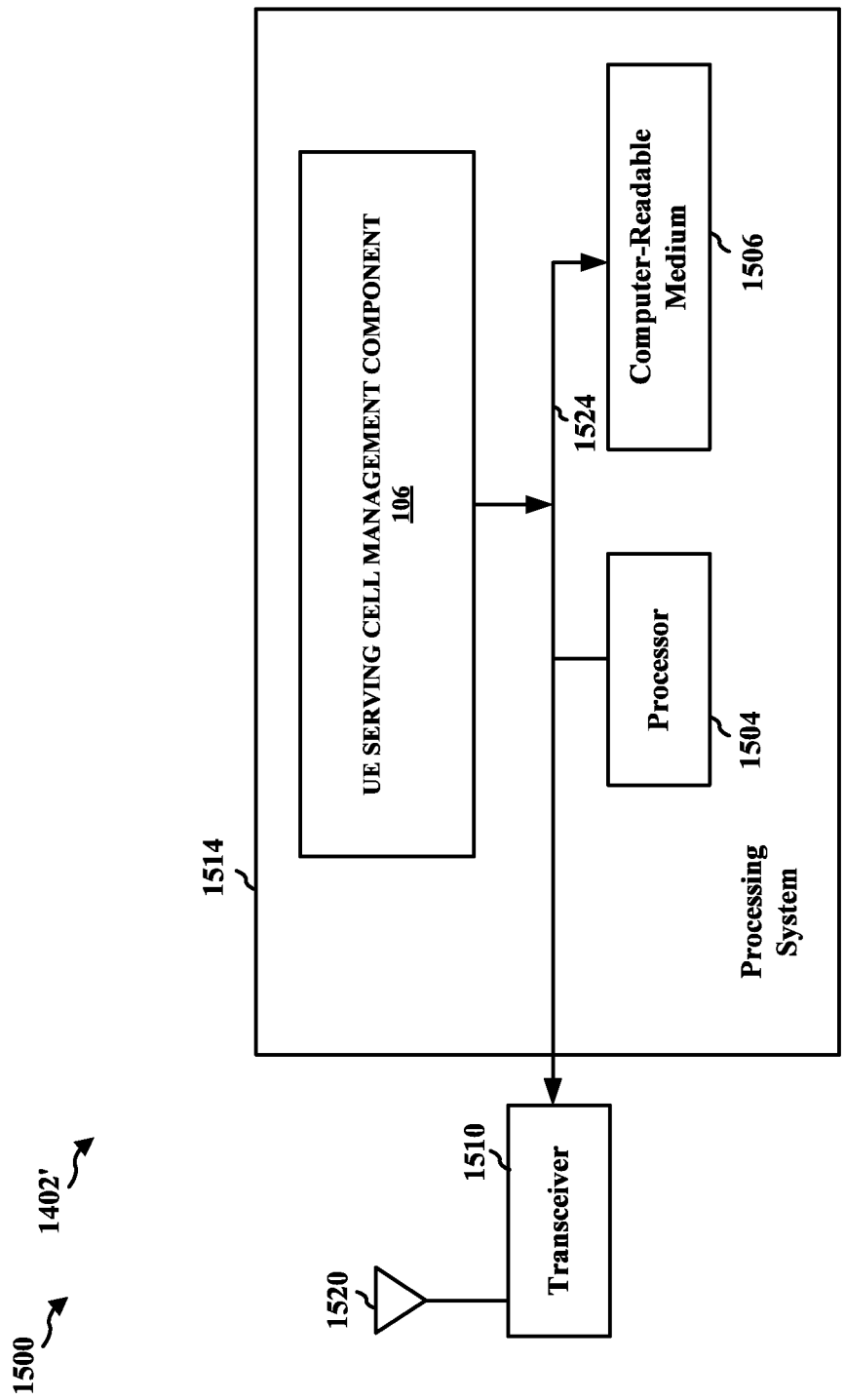
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, UE serving cell management component 106 (see, e.g., FIG. 12), and the computer-readable medium 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. In addition, the transceiver 1510 may be configured to transmit at least control signals to one or more network entities and may potentially include transmission module 1406 of FIG. 14. In an aspect, transceiver 1510 and/or the one or more antennas 1520 may be configured to receive, from a UE, a Proximity Indication message, wherein the Proximity Indication message initiates a serving cell change (e.g., under legacy LTE procedures).

The processing system 1514 includes a processor 1504 coupled to a computer-readable medium 1506. The processor 1504 is responsible for general processing, including the execution of computer-executable code stored on the computer-readable medium 1506. The computer-executable code, when executed by the processor 1504, causes the processing system 1514 to perform the various functions described supra for any particular apparatus. The computer-readable medium 1506 may also be used for storing data that is manipulated by the processor 1504 when executing computer-executable code. The processing system further includes UE serving cell management component 106 (see, e.g., FIG. 12). The modules/components may be computer-executable code modules running in the processor 1504, resident/stored in the computer-readable medium 1506, one or more hardware modules coupled to the processor 1504, or some combination thereof.

In one configuration, the apparatus 1402' for wireless communication includes means for receiving, from a UE, a Proximity Indication message, wherein the Proximity Indication message initiates a serving cell change; means for obtaining a speed of the UE; and means for suppressing the initiation of the serving cell change based on the speed of the UE. The aforementioned means may be one or more of the aforementioned modules of the apparatus 1402 and/or the processing system 1514 of the apparatus 1402' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of serving cell management at a user equipment (UE) for wireless communications, comprising: determining, by the UE, that a serving cell change condition exists for an initiation of a serving cell change for the UE, wherein the serving cell change comprises changing a serving cell of the UE from a macro cell to a low power cell; determining, by the UE, a speed of the UE; determining, by the UE, the UE is in a connected mode; and suppressing, by the UE, the initiation of the serving cell change based on the speed of the UE and the UE being in the connected mode, wherein suppressing the initiation of the serving cell change comprises: suppressing a transmission of a Proximity Indication message from the UE to a network entity associated with the macro cell until the speed of the UE is determined to be below a first speed threshold value; determining, by the UE, that the speed of the UE exceeds a second speed threshold value; and suppressing, by the UE, the initiation of the serving cell change based on determining that the speed of the UE exceeds the second speed threshold value, wherein the second speed threshold value is lower than the first speed threshold value.

2. The method of claim 1, wherein determining the speed of the UE comprises determining, by the UE, a UE speed profile based on one or both of a rate of change or a standard deviation of a Reference Signal Received Power.

3. The method of claim 1, wherein determining the speed of the UE comprises estimating, by the UE, the speed of the UE using a global positioning system.

4. The method of claim 1, wherein determining the speed of the UE comprises determining, by the UE, a UE speed profile using an accelerator sensor associated with the UE.

5. The method of claim 1, wherein determining the speed of the UE comprises: computing, at the UE, a Doppler shift of a Common Reference Signal transmitted by the macro cell; and determining, by the UE, the speed of the UE as a function of the Doppler shift.

6. The method of claim 1, wherein determining the speed of the UE comprises determining, by the UE, a UE speed profile that includes at least one of a speed class, a speed range, or a speed characterization of the UE at a particular time, and wherein suppressing the initiation of the serving cell change is based on the UE speed profile.

7. The method of claim 1, further comprising initiating, by the UE, the serving cell change of the UE in response to the speed of the UE being determined to be below a second speed threshold value.

8. A user equipment (UE) for wireless communications configured for serving cell management, comprising: a memory configured to store instructions; and one or more processors communicatively coupled with the memory, wherein the one or more processors are configured to execute the instructions to:
determine that a serving cell change condition exists for an initiation of a serving cell change for the UE, wherein the serving cell change comprises changing a serving cell of the UE from a macro cell to a low power cell; determine a speed of the UE;
determine the UE is in a connected mode; and suppress the initiation of the serving cell change based on the speed of the UE and the UE being in the connected mode, wherein the one or more processors are further configured to execute the instructions to: suppress a transmission of a Proximity Indication message from the UE to a network entity associated with the macro cell until the speed of the UE is determined to be below a first speed threshold value; determine that the speed of the UE exceeds a second speed threshold value; and suppress the initiation of the serving cell change based on a determination that the speed of the UE exceeds the second speed threshold value, wherein the second speed threshold value is lower than the first speed threshold value.

9. The UE of claim 8, wherein the one or more processors are further configured to execute the instructions to determine a UE speed profile based on one or both of a rate of change or a standard deviation of a Reference Signal Received Power.

10. The UE of claim 8, wherein the one or more processors are further configured to execute the instructions to estimate the speed of the UE using a global positioning system.

11. The UE of claim 8, wherein the one or more processors are further configured to execute the instructions to determine a UE speed profile using an accelerator sensor associated with the UE.

12. The UE of claim 8, wherein the one or more processors are further configured to execute the instructions to: compute a Doppler shift of a Common Reference Signal transmitted by the macro cell; and determine the speed of the UE as a function of the Doppler shift.

13. The UE of claim 8, wherein the one or more processors are further configured to execute the instructions to initiate the serving cell change of the UE in response to the speed of the UE being determined to be below a second speed threshold value.

14. A user equipment (UE) for wireless communications, comprising: means for determining, by the UE, that a serving cell change condition exists for an initiation of a serving cell change for the UE, wherein the serving cell change comprises changing a serving cell of the UE from a macro cell to a low power cell; means for determining, by the UE, a speed of the UE; means for determining the UE is in a connected mode; and means for suppressing, by the UE, the initiation of the serving cell change based on the speed of the UE and the UE being in the connected mode, wherein the means for suppressing the initiation of the serving cell change comprises: means for suppressing a transmission of a Proximity Indication message from the UE to a network entity associated with the macro cell until the speed of the UE is determined to be below a first speed threshold value; means for determining that the speed of the UE exceeds a second speed threshold value; and means for suppressing the initiation of the serving cell change based on determining that the speed of the UE exceeds the second speed threshold value, wherein the second speed threshold value is lower than the first speed threshold value.

15. The UE of claim 14, wherein the means for determining the speed of the UE comprises means for determining a UE speed profile based on one or both of a rate of change or a standard deviation of a Reference Signal Received Power.

16. The UE of claim 14, wherein the means for determining the speed of the UE comprises means for estimating the speed of the UE using a global positioning system.

17. The UE of claim 14, wherein the means for determining the speed of the UE comprises means for determining a UE speed profile using an accelerator sensor associated with the UE.

18. The UE of claim 14, wherein the means for determining the speed of the UE comprises: means for computing a Doppler shift of a Common Reference Signal transmitted by the macro cell; and means for determining the speed of the UE as a function of the Doppler shift.

19. The UE of claim 14, further comprising means for initiating, by the UE, the serving cell change of the UE in response to the speed of the UE being determined to be below a second speed threshold value.

* * * * *